United States Patent [19]

Uemura et al.

[11] 4,229,221
[45] Oct. 21, 1980

[54] METHOD FOR PRODUCING REFRACTORIES

[75] Inventors: Seiichi Uemura; Syunichi Yamamoto, both of Kawasaki; Takao Hirose, Kamakura; Hiroaki Takashima, Kawasaki; Osamu Kato, Yokohama; Minoru Nagai, Kawasaki, all of Japan

[73] Assignees: Nippon Oil Co., Ltd.; Shinagawa Refractories Co., Ltd., both of Tokyo, Japan

[21] Appl. No.: 3,761

[22] Filed: Jan. 15, 1979

[30] Foreign Application Priority Data

Jan. 18, 1978 [JP] Japan ............................ 53-4105
Jan. 18, 1978 [JP] Japan ............................ 53-4106

[51] Int. Cl.$^2$ ............................................ C04B 35/04
[52] U.S. Cl. ............................................ 106/58; 106/56; 106/62; 106/65
[58] Field of Search ............ 106/44, 56, 58, 65, 106/62; 208/41, 349, 367

[56] References Cited

U.S. PATENT DOCUMENTS

| | | | |
|---|---|---|---|
| 3,497,581 | 2/1970 | Wuhrer et al. | 106/58 |
| 3,664,853 | 5/1972 | Leonard et al. | 106/58 |
| 3,826,662 | 7/1974 | Paolini | 106/67 |
| 3,994,738 | 11/1976 | Visser | 106/56 |
| 4,008,194 | 2/1977 | Shintani | 106/56 |
| 4,022,739 | 5/1977 | Bove | 106/56 |
| 4,072,531 | 2/1978 | Funabiki et al. | 106/56 |

*Primary Examiner*—James Poer
*Attorney, Agent, or Firm*—Ostrolenk, Faber, Gerb & Soffen

[57] ABSTRACT

A method for producing refractories which comprises the steps: continuously feeding as a raw material a heavy oil having a boiling point higher than 150° C. obtained by thermal cracking or steam cracking of petroleum hydrocarbons in a first state stirring vessel maintained at a pressure of higher than 2 Kg/cm$^2$G and a temperature within the range of from 300° to 360° C.; maintaining said raw material oil at an average residence time of longer than 15 minutes; continuously withdrawing a first stage treated oil from said first stage stirring vessel; supplying said first stage treated oil in a second stage stirring vessel maintained at a temperature within the range of from 370° to 450° C.; continuously withdrawing a second stage treated oil from said second stage stirring vessel while maintaining said first stage treated oil at an average residence time of from 30 minutes to 10 hours; continuously obtaining pitch by eliminating lighter components from said second stage treated oil; and producing unburned refractories and refractories, the former being obtained by mixing said pitch with basic refractory materials, followed by molding, and the latter being obtained by impregnating and filling said pitch in open porous portions of refractories.

8 Claims, 1 Drawing Figure

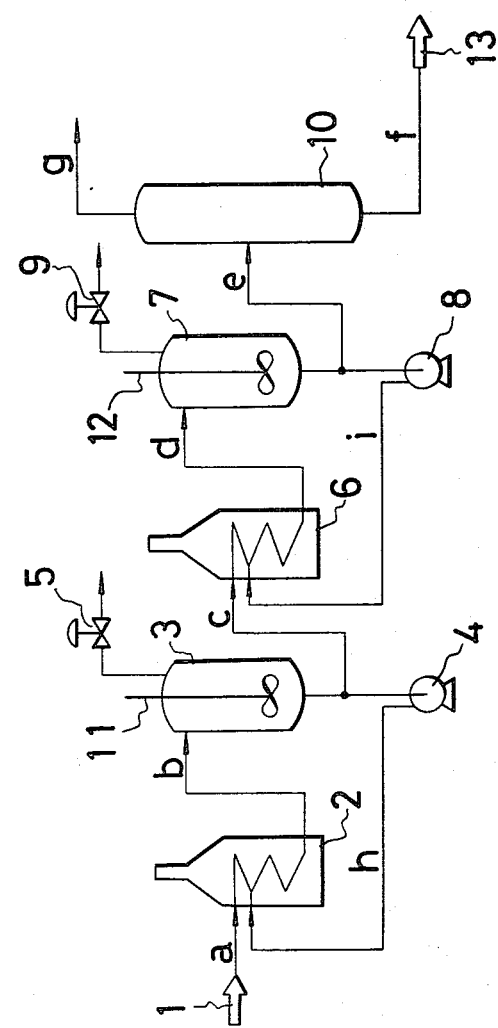

METHOD FOR PRODUCING REFRACTORIES

BACKGROUND OF THE INVENTION

This invention relates to a method for producing refractories, for example, fire-bricks, and particularly to a method for producing lining bricks of a blast or steel-making furnace to be used in areas contacting molten steels.

Among these refractories have been known are those which contained a variety of carbonaceous materials as a binder or an impregnant. That is to say, coal tar pitch has been employed as a binder or an impregnant heretofore. However, since it contains a large amount of, substances detrimental to the humane body such as a nitrogen-containing compound or oxygen-containing compound, there occur sanitary problems for operators during the production or use of the refractories. Further, it is necessary to dilute the coal tar pitch with anthracene oil or creosote oil in order to facilitate the workability during the manufacturing process of refractories. As a result, the toxicity of impregnants is largely increased owing to the incorporation of of such a solvent. Accordingly, the present situation is that a harmless substitute for coal tar pitch is strongly desired.

In addition, as described in Japanese Patent Publication Laid Open No. 51-115512, it has been known that asphalt obtained by deasphalting of petroleum, or a product obtained by heating a petroleum asphalt to 350°–450° C. is employed as an impregnant or a binder. However, when a refractories using an asphalt-containing binder are practically employed, for example, as a lining brick for a convertor, under the severe conditions during its use the bonding force is very weak in comparison with that of coal tar pitch, and therefore, its effect to prevent the permiation of slag thereinto is so low that it can not be put into practice.

There is also disclosed the use of substances as an impregnant or a binder which are obtained by heating and polymerizing a heavy oil obtained by steam cracking of petroleum in the presence or absence of catalysts (Japanese Patent Publications Laid Open No. 51-10811, No. 51-10816, No. 51-114409). Although the above defects resulting from use of coal tar pitch are eliminated by these methods, in the case the substance obtained by one step heat treatment of the cracked heavy oil in the presence or absence of catalyst is employed as an impregnant or binder for refractories, it is not fully satisfactory to the improvement of slag-resistant properties of refractories and to the decrease of loss thereof, as shown later in Comparative Examples.

In addition to this, when the heavy oil disclosed in these methods is heat treated in one step, carbonaceous material is deposited in reactors for heat treatment. As a result, it becomes impossible to prevent local heating, and therefore, heat-treated products can not be obtained continuously on an industrially advantageous scale. This makes it impossible to produce refractories industrially and conveniently.

On the other hand, in the case where it is intended to obtained a useful pitch by heat treatment in one step, there occur the following defects.

Pitch used for a binder of refractories is desired to have a high content of fixed carbon (Conradson carbon) from the problem on its coking property, and is required further to have a softening point ranging from 60° to 100° C. from the viewpoint of workability. Such a pitch as is employed for impregnating refractories is also desired to have a high content of fixed carbon (Conradson carbon) owing to the problem on its slag-resistant property and is required to be liquid at room temperatures (about 20° C.) or to have a softening point of less than 100° C. from the view point of workability. However, at the same time when a highly fixed carbon-containing pitch is obtained by a simple heat treatment in one step of a heavy residium produced as a by-product in the above thermal or steam cracking, its softening point increases making it difficult to use it as binder. For example, if the residium is heat treated to obtain a pitch containing fixed carbon of more than 50%, the softening point of the product pitch inevitably increases to about 150° C. and intended pitch can not be obtained.

For example, in Japanese Patent Publication No. 46-2417, a heavy residual oil is heat treated to obtain a pitch having a boiling point of more than about 400° C., however the softening point of pitch obtained is as high as 230°–250° C.

Even in the case of heat treatment in two steps, as disclosed in Japanese Patent Publication Laid Open No. 48-73045, the softening point of pitch obtained is as very high as 120°–215° C., wherein a heavy residual oil is treated in the first step under the conditions of a pressure of 20–200 Kg/cm$^2$, a temperature of 400°–600° C. and a time of 10–1200 secs., followed by removing of a lighter oil boiling at a temperature below 400° C., and in the third step is treated by heating under the conditions of a lower temperature of 300°–480° C., a pressure of from atmospheric pressure to 50 Kg/cm$^2$ and a time of 1–10 hrs.

As a means for adjusting softening points of pitch, it is suggested to control the given softening points thereof by adding a lighter oil such as gas oil or a heavy oil to a pitch with high softening point (Japanese Patent Publication No. 43-30073). However, in the case that these hydrocarbon oils are included in the pitch, they are gasified on its calcining. As the result, a molded body such as refractories is expanded rapidly to bring about the change of shape of product, the formation of hollows and further the problem of rupture in the product. Accordingly, it is impossible to obtain a satisfactory molding.

Further, in Japanese Patent Publication Laid Open No. 49-35420, a heavy oil is heat treated at a temperature of 350°–470° C. under pressure, and a lighter component or oil is eliminated to control the softening point, if necessary. That is to say, the softening point can be varied depending upon the amount of lighter oil to be removed and the manner of its removal. However, the presence of any lighter component in the product pitch would prevent one from obtaining a satisfactory molded body, as described before. A pitch of practical use does not contain substantially fractions boiling at temperatures lower than 400° C. The softening point of pitch obtained from a heavy oil having a boiling point higher than 400° C. is remarkably increased, as disclosed in Japanese Patent Publication No. 48-73405.

BRIEF SUMMARY OF THE INVENTION

This invention is concerned with an excellent method for producting refractories not having the above-mentioned disadvantages or defects incidental to the conventional art.

It is an object of this invention to eliminate these defects of the conventional art and to provide an industrially useful method for producing refractories having excellent characteristics to improve slag-resistant property and having a long life.

It is another object of this invention to provide useful unburned refractories produced by incorporating a pitch in basic refractory materials and by molding.

Further, it is another object of this invention to provide pitch-impregnated refractories capable of impregnating and filling a pitch in open porous portions of burned refractories.

The inventors of this invention earlier filed another Japanese patent application relating to a method of production of pitch with use of a heavy oil as a raw material which can be continuously run for a long period of time.

This invention has been completed by finding the fact that when refractories are manufactured by using the pitch obtained by the method of the above prior patent application, better refractories are obtained as compared with those obtained by using a conventional pitch produced from a heavy oil.

This invention is concerned with a method for producing unburned refractories and pitch-impregnated refractories, which comprises continuously feeding a raw material oil such as a heavy oil having a boiling point of higher than 150° C. obtained by thermal cracking or steam cracking of petroleum hydrocarbon in a first stage stirring vessel maintained at a pressure of higher than 2 Kg/cm$^2$G and a temperature within the range of from 300° to 360° C., maintaining said raw material oil at an average residence time of longer than 15 minutes, continuously withdrawing a first stage treated oil from said first stage stirring vessel, supplying said first stage treated oil to a second stage stirring vessel maintained at a temperature within the range of from 370° to 450° C., continuously withdrawing a second stage treated oil from said second stage stirring vessel while maintaining an average residence time of from 30 minutes to 10 hours, continuously obtaining pitch by removing a lighter component from said second stage treated oil, and producing unburned refractories and pitch-impregnated refractories, the former being obtained by mixing said pitch in basic refractory materials and by molding, and the latter being obtained by impregnating and filling said pitch in open porous portions of burned refractories.

BRIEF DESCRIPTION OF THE DRAWING

The FIGURE is a flow diagram to show an example of the process to effect the method according to this invention. This invention is more clearly understood on reference to the drawing appended hereto.

DETAILED DESCRIPTION OF THE INVENTION

In this invention, a heavy residual oil boiling at a higher temperature than 150° C. obtained as a by-product in the production of olefins by thermal cracking or steam cracking of petroleum hydrocarbon is employed as a raw material. Herein lighter hydrocarbons such as naphtha, kerosene, etc. are generally used as the petroleum hydrocarbon, and the thermal cracking and steam cracking are normally carried out at temperatures of 600°–1000° C. As a heavy residual oil in this invention, said oil having a boiling point higher than 150° C., preferably higher than 200° C., is used.

As to the reaction condition in the first stage of this invention, there are some suitable ranges, and the object of this invention can not effectively be attained if the reaction is performed out of the ranges. That is to say, the pressure in the first stage stirring vessel is more than 2 Kg/cm$^2$G, preferably 2–30 kg/cm$^2$G and more preferably 5–20 Kg/cm$^2$G. As to the pressure condition, a sufficient pressure for sealing the oil vapor of raw material oil in the stirring vessel is necessary, and in response to the need during running, a higher pressure than it may be employed, for example, external pressure may be applied by using an inert gas and the like. However, in the case wherein heat treatment is carried out under a lower pressure than the prescribed one of this invention, for example, under atmospheric pressure, not only is the yield of finished product decreased, but also there occur such difficulties as the deposition of carbon and the increase of the softening point of formed pitch in the process in the second stage, although the reason has not yet been theoretically elucidated. Thus, the object of this invention can not be attained. The first stage stirring vessel must be maintained at a temperature in the range of 300°–360° C., preferably 330°–350° C. As a matter of course, the object of this invention can be completed, even if the temperature is varied within the above range while running, however, it is preferable to be maintained at an optional constant temperature from the demand on operation. At a lower temperature condition than 300° C., the effect according to this invention can not be expected. At a temperature higher than 360° C., the occurrence of problem such as the carbon deposition in the first stage stirring vessel makes the continuous operation difficult. The average residence time of raw material oil in the first stage stirring vessel must be at least 15 minutes, and is preferably 1–5 hours, according to this invention. If it is less than 15 minutes, the object of this invention can not be attained.

The treated oil obtained in the first stage or step is fed in the second stage stirring vessel. The temperature of said vessel must be kept within the range of 370°–450° C., preferably 390°–430° C. Commonly, constant temperature within the above temperature range is preferably maintained. In the case of a temperature lower than 370° C., the intended physical properties of product pitch are not substantially improved. If it is higher than 450° C., the obtained product is rather closer to a coke than a pitch. In any event, the product obtained is of no commercial value. The average residence time of treated oil in the second stage stirring vessel may be arbitrarily selected in response to the temperature of treated oil, however, it is generally suitable to be from 30 minutes to 10 hours, preferably from 1–5 hours. The operating pressure is not particularly limited, it is within the range of 2–20 Kg/cm$^2$G, preferably 5–15 Kg/cm$^2$G in view of yield and operational problems.

The objective pitch is obtained by removing a lighter element from the second stage treated oil. The method to remove the lighter ingredient therefrom is not particularly limited, however it is generally distilled off by a vacuum distillation technique such as continuous flashing. The "lighter oil" referred to in this invention is a light fraction having a boiling point lower than about 400° C. That is to say, the product pitch of this invention preferably substantially comprises a heavy oil having a boiling point higher than 400° C. The "substantially" herein referred to means, as described later, that when unburned refractories are obtained by mixing the pitch in refractory materials and by molding and when pitch-impregnated refractories are obtained by impregnating and filling the pitch in open porous portions of burned refractories, a lighter oil is allowed to be contained in an amount not detrimental to the product. The amount of lighter oil component normally contained in the product pitch is preferably 0-5%.

According to this invention, the raw material oil is generally preheated to a prescribed or stated temperature prior to being fed in the first stage stirring vessel. The "prescribed or stated" referred to in this invention stands for the temperature in the stirring vessel or a temperature somewhat higher than it. As a means to previously heat the raw material, there are many methods to be employed such as a method wherein the raw material oil is passed through heating tubes to be directly heated to the prescribed temperature; a method wherein after a recycle oil is withdrawn from the first stage stirring vessel, the heated recycle oil is further mixed with the raw material oil to reach the prescribed temperature; a method wherein the raw material oil heated to a certain temperature by the heated recycle oil and heating tubes is mixed with the starting raw material oil to attain the stated temperature; and a method wherein after the mixing of raw material oil and recycle oil, the mixture is heated to the prescribed temperature. Instead of the above, by providing the first stage stirring vessel with heating apparatus, the raw material may be fed into said stirring vessel without pre-heating or by heating previously with the above-stated methods.

The raw material oil treated in the first stage stirring vessel is charged subsequently into the second stage stirring vessel. In this case also, the raw material oil is normally pre-heated. As the means, the same methods as those in the case of raw material oil described above may be employed.

The period of time required for raising the temperature of raw material oil or treated oil to the intended temperature by passing it through heating tubes is not particularly restricted. However, it is industrially advantageous to be raised within 5 minutes, in general. When temperature raise is effected over 5 minutes or more, such a means as the increase of heating pipe length or the use of an extremely slow linear-velocity is compelled to be taken. However, such a means is not industrially economical.

According to the method of this invention, a suitable pitch normally having a fixed carbon content of 45% or more and being liquid at 20° C. or having a softing point of less than 100° C. can be obtained. As clearly described later in Examples, the pitch thus obtained is conveniently employed as a binder for molding after the mixing thereof with basic refractory materials, or is effectively used for the purpose of impregnating and filling in the open porous space of burned refractories.

In addition, according to the method of this invention, a pitch can be continuously produced by employing a specific two stage treatment system, wherein carbonaceous or carbon is not deposited in the first and second stirring vessels, and further such good reaction conditions as no deposition of carbon in the heating pipe are maintained in the case of pre-heating. Therefore, carbonaceous material-containing refractories can be usefully manufactured, and this invention is clearly distinguishable from the prior art in these respects.

The stirring vessel herein referred to is a receptacle having desired capacity and capable of completely mixing conditions being substantially maintained therein. It is commonly provided with stirring wings and is of tank type. Generally a steel drum with stirring wings is employed.

In the heat treatment using a stirring receptacle or vessel, a homogeneous or uniform condition of reactants is obtained, and an arbitrary or long average residence time can also be employed. At the same time, temperature control thereof is easy, and treating temperatures also can be kept constant. Further, it is possible to perform a stable running. As the result, the reaction can be conducted quite stably, and at the same time, a finished product having uniform properties can be produced with high reproducibility and in a high yield. Accordingly, such a heat treatment means is very advantageous in the above-stated respects, as compared with that using a pipe reactor. However, in the heat treatment of a heavy oil, there often occur such difficulties as the impossibility of stirring resulting from coking in the receptacle and the clogging of apparatus. It has now been found that according to this invention, these defects have been eliminated by employing two sequentially operated stirring vessels under the prescribed conditions, as described above, and that the advantages can fully be displayed.

By carrying out the specific treatment in two steps or stages of this invention, carbon deposition is not seen in the heating tube and stirring vessel. Such effects can not be expected from the prior art. Although the reason is not strictly known, it appears that in the conventional method, a sort of components contained in the raw material oil are modified into an initial benzene-insoluble substance (compound insoluble in benzene formed unexpectedly at the initial stage of reaction) or into a precipitated carbon. In contrast with this, according to the method of this invention, in the first stage treatment said sort of components seem to be converted into more stable substances, for example, by isomerization reaction and are maintained stable in the treatment in the second stage to lead to the inhibition of carbon deposition. From the fact that it needs 15 minutes or more for the treatment in the first stage can be assumed that the time is required for changing said sort of compounds to more stable ones. In the case that a pitch thus obtained is used as a binder for basic refractory materials or an impregnant for-burned refractories, it shows very excellent properties, as described later. This invention has been accomplished by finding such a fact.

Generally, properties required for a binder in order to form carbon bond are understood that they are a high carbonization yield and high carbon bonding force. As their index, a fixed carbon content is used for the former, and a $\beta$-resin content, for the latter. To say nothing of coal tar pitch, much effort has been made in order to increase these two contents in a petroleum binder. But it has now been made clear that in many cases, the characteristic properties of binder are not necessarily determined definitively on the ground of the above index, depending upon the kind of binder or the situation in use thereof.

In other words, it is considerably difficult to prescribe the ability of binder on the strength of properties such as a fixed carbon and $\beta$-resin contents. Accordingly, there are many cases where even if a binder has the same fixed carbon and $\beta$-resin contents, it shows quite a different behavior depending upon the property and shape of carbon on carbonization or upon the property of $\beta$-resin.

Whether it is a coal tar pitch or a petroleum binder or not, it is a very complicated mixture comprising a variety of compounds. It should be considered that the corresponding relationship between the final property of the binder and the fixed carbon or β-resin content exists in some degree only in the properties quite resembling to one another in the composition and chemical structure.

The final ability acquired by using such binders in the objective refractories of this invention is mainly useful for increasing the life time thereof. Although the factor controlling it is so complicated that it is almost impossible to definitively determine, for example, in the case of refractories for lining a convertor, it is in preventing the refractories from penetrating of slag therein. Further, in order to prevent such penetration, the presence of carbon or carbon bond in the refractories is necessary. However, in practical use, the presence of oxygen or carbon dioxide can not be disregarded. The difference of wasting speed of refractories resulting from oxygen or carbon dioxide to the carbon formed from the use of binder is also another important factor affecting the life time of refractories in parallel with mechanical strength thereof.

The reason why the petroleum binder used in this invention is effective for extending the life time of refractories is unknown, but it is considered that there occurs some specific reaction by reacting under the control of formation of initial benzene-insoluble substances, and that as a result, some ability to contribute greatly to the extension of life time of refractories is given.

In the beginning, an example of processes for producing pitch in accordance with the method of this invention is described with reference to the Figure. Raw material oil 1 is raised in temperature to a prescribed temperature by passing first heater 2 through line a and is fed to first stage stirring vessel 3 through line a in completely mixed condition with first stirring wing or propeller 11. The first stage stirring vessel is controlled under constant pressure with pressure controlling valve 5. Part of treated oil in the first stage stirring vessel is charged in the first heater 2 through line h by circulation pump 4 and is mixed with the raw material oil fed in said heater. The first stage treated oil continuously withdrawn from the first stage stirring vessel 3 is passed to second heater 6 through line c and is increased therein in temperature to a prescribed temperature, and then is supplied in second stage stirring vessel or agitator 7 through line a in completely mixed state with second stirring wing or propeller 12. The second stage stirring vessel 7 is kept at constant pressure with pressure controlling valve 9. Part of treated oil in the second stage 7 is fed in the second heater 6 passing through line i by circulation pump 8 to be mixed with the first stage treated oil.

The second stage treated oil continuously taken out of the second stage stirring vessel is fed in vacuum flashing tower 10 through line e, lighter oil is removed by line g and pitch 13 is obtained from line f.

According to the method of this invention, the pitch thus obtained is compounded with basic refractory materials. The "basic refractory material" herein referred to is known dolomite-containing refractory materials such as a dolomite clinker, synthetic dolomite clinker, or a magnesia-containing refractory material such as a sea water magnesia clinker, electromolten magnesia clinker, and natural magnesite, etc. One or two or more of these refractory materials can be used in a mixture. In addition, as an additive, a small amount of simple carbon substances such as graphite and the like may be employed. The average particle size of these refractory materials is normally in the degree of less than 1 cm, for example, normally 6–0.1 mm, and it is preferable to use in parallel those having different particle sizes.

The mixing of pitch as a binder referred to in this application with refractory raw materials is carried out by kneading with a heating mixer in the same way as in the case of using conventional coal tar pitch. The mixing temperature is not particularly restricted, however, a temperature in such a range wherein kneading is fully carried out and detrimental decomposition reaction does not occur is taken. For example, it can be carried out at a temperature of 100°–250° C. The amount of said pitch used is ordinarily 2–20 parts by weight, preferably 4–10 parts by weight, to 100 parts by weight of basic refractory materials.

The pitch obtained by the specific treatment according to the method of this invention has excellent properties as a binder or an impregnant without any further treatment. In addition, it has in particular sufficiently low softening points and viscosities. Accordingly, it can be used without adding further any viscosity depressants such as a variety of hydrocarbon oils, heavy oils and gas oils, etc. Thus, the deterioration of brick in use owing to decomposition products resulting from these additives is controlled and decreased. However, they may be employed in so far as they do not adversely affect the final product. The kneaded mixture is then molded into a brick having a desired shape to produce unburned refractories. The strength of refractories can be increased by baking the molded product at temperature of about 250°–400° C. before their use.

Further, according to the method of this invention, the pitch thus obtained is impregnated into burned refractories. The burned "refractories" herein referred to are burned refractories commonly employed for the part coming into contact with a molten product of steel and other metals. For example, they are burned dolomite-containing brick, burned magnesia-dolomite-containing brick, burned alumina-containing brick, and burned magnesia-spinel-containing brick, etc. These burned bricks are obtained by conventional methods wherein refractory materials such as a dolomite-containing compound, magnesia-containing compound, alumina-containing compound, etc. combined with a carbon-containing compound, tackifier and binder as an aid are burned at high temperatures to form a ceramic bond. It is preferable, in this invention, to use a dolomite-containing or dolomite-magnesia-containing brick. These burned refractories have open porous portions, and therefore melted metallic substances enter therein and erode them without further treatment. Accordingly, they can not be used for a long period of time. In this invention, the open porous portions are impregnated and filled with the pitch obtained by the above-mentioned method. The manner to impregnate may be the same as the conventional way using a coal tar pitch as an impregnant. The refractories are normally preheated and are taken in an impregnating bath to be degassed under vacuum. Then, melted pitch is introduced thereinto and is filled and impregnated in the open porous portions under atmospheric pressure or elevated pressures.

The impregnating temperature is not limited in particular. It may be any temperature ranging from about 20° to 250° C. It is preferable to carry out at a suitable temperature for forming pitch having a viscosity of 200 centipoise or less so that the pitch may be impregnated into the burned refractories. At higher temperatures, for example, at a temperature close to 300° C., the properties of pitch often become variable in this impregnating stage, according to circumstances. Therefore, this should be avoided.

The method of this invention will be further illustrated hereinunder by way of Examples and Comparative Examples, but it should not be construed that this invention is restricted by these examples.

Examples 1-2 and Comparative Examples 1-2

EXAMPLES 1-2

As a raw material oil was employed a heavy residual oil obtained as a by-product in steam cracking of naphtha. The properties are shown in Table I. The heavy residual oil as a raw material was raised in temperature to a prescribed temperature by passing through a pipe still, and then was continuously charged into the first stage stirring vessel in completely mixed state to be heat treated. The stirring vessel was maintained at a prescribed pressure and average residence time by controlling the level therein.

The heat-treated product continuously withdrawn from the first stage stirring vessel was increased in temperature to a prescribed temperature by passing through a pipe still in the second stage and then was introduced into the second stage stirring vessel to be subjected to heat treatment at a prescribed pressure and average residence time while controlling the level. Then the heat-treated product after completion of the final heat treatment was continuously withdrawn from the second stage stirring vessel and was introduced into a flash distillation tower operated under the conditions of 250° C. and a pressure of 70 mm Hg. After a lighter oil having a boiling point of 400° C. or less was distilled off from the flash distillation tower, a product pitch was taken out at the bottom. The treating conditions in the first and second stages, and the physical properties of the product pitch are shown in Table II. The running was carried out for 150 hours after a stationary temperature was attained both in Example 1 and in Example 2. As a result, only a slight fouling was found in the pipe still and stirring vessel, however no obstacle to operations was found.

COMPARATIVE EXAMPLES 1-2

A conventional one stage heat treatment reaction was performed to compare with the method according to this invention.

The same raw material oil as that used in Example 1 was fed in a pipe still to increase its temperature to a prescribed temperature and was continuously charged into a soaker. Then it was treated with heat under a prescribed pressure while controlling the level so as to be able to maintain a prescribed residence time. After that, the heat-treated oil was led to a flash distillation tower, and a product pitch was obtained in the same manner as in Example 1. The results are shown in parallel in Table II. However, in Comparative Example 1, coking occurred to result in clogging of the pipe still in 10 hours of operation after the temperature became stationary. In Comparative Example 2, the operation was carried out for 150 hours after the temperature came into a stationary state.

COMPARATIVE EXAMPLE 3

Pitch was obtained by operating in the same way as in Example 1 except that the temperature of the first stage reaction vessel was maintained at 240° C. In this case, the running was stopped in 18 hours after the temperature came into a stationary state, because the pipe still was clogged. The results are shown in Table II.

TABLE I

| Property of raw material oil | | |
| --- | --- | --- |
| Special gravity (15° C./4° C.) | | 1.047 |
| Fixed carbon (%) | | 4.2 |
| Distillation characteristics | IBP | 156(°C.) |
| | 5% | 179 |
| | 10% | 195 |
| | 20% | 208 |
| | 30% | 218 |
| | 40% | 235 |
| | 50% | 269 |
| | 60% | 312 |
| | 70% | 346 |

TABLE II

| Experiment number | Treating condition in first stage | | | Treating condition in second stage | | | Initial benzene-insoluble component (%) | Yield of pitch (%) |
| --- | --- | --- | --- | --- | --- | --- | --- | --- |
| | Temperature (°C.) | Pressure (Kg/cm²) G | Average residence time (hour) | Temperature (°C.) | Pressure (Kg/cm²) G | Average residence time (hour) | | |
| Example 1 | 310 | 15 | 2 | 400 | 12 | 2 | 2.5 | 46 |
| Example 2 | 350 | 17 | 1 | 400 | 10 | 1 | trace | 45 |
| Comparative Example 1 | — | — | — | 400 | 12 | 2 | 10 | 35 |
| Example 2 | — | — | — | 330 | 10 | 1 | 0 | 50 |
| Example 3 | 240 | 15 | 2 | 400 | 12 | 2 | 7.5 | 36 |

Each of various pitches thus obtained was used as a binder in an amount of 5 parts by weight. It was mixed with 35 parts by weight of granular dolomite clinker of 0.6–5.0 mm in particle size at 135° C. by using a heating kneader, and further 65 parts by weight of finely powdered magnesia clinker having a particle size smaller than 0.6 mm was added thereto. After kneading, the mixture was molded into a brickline shape by press molding, and then the molded product was baked at about 320° C. for 12 hours to obtain unburned refractories. The loss in amount of these refractories in a practical furnace test is shown in Table III. As a Comparative Example 4, a mixture of coal tar pitch and 5% of creosote oil added as a diluent was employed in the same way. The result is also shown in parallel in Table III.

TABLE III

| | Size of original refractories (mm) | Remainder size (mm) | Loss in amount (mm) |
| --- | --- | --- | --- |
| Example 1 | 700 | 217 | 483 |
| Example 2 | 700 | 225 | 475 |

TABLE III-continued

|  | Size of original refractories (mm) | Remainder size (mm) | Loss in amount (mm) |
|---|---|---|---|
| Comparative Example 1 | 700 | 164 | 536 |
| Comparative Example 2 | 700 | 75 | 625 |
| Comparative Example 3 | 700 | 173 | 527 |
| Comparative Example 4 | 700 | 195 | 505 |

Example 3 and Comparative Example 5

EXAMPLE 3

The same raw material oil as in Example 1 was treated with heat by using the reforming apparatus shown in the Figure. The raw material oil was increased its temperature to 355° C. by passing to first heater 2 (diameter of heating tube. 21.7 mm) through line a. Then it was continuously fed in first stage stirring vessel 3 having a capacity of 300 lit. which was agitated with a stirrer under such a condition that there was no residence zone and was treated with heat at an average residence time of 3 hours. The first stage stirring vessel was maintained at 350° C., and the pressure therein was controlled at 20 Kg/cm$^2$G by pressure controlling valve 5. The flow velocity of the oil in the first heater tube was maintained at 2 m/sec by circulating from the first stage stirring vessel to the first heater through line h by first circulation pump 4.

The first stage treated oil continuously taken out from the first stage stirring vessel was introduced into second heater 6 through line c, and the temperature was increased to 410° C. Then it was continuously fed in second stage stirring vessel 3 having a capacity of 300 lit. The second stage stirring vessel is maintained at a temperature of 405° C., and the pressure is controlled by 15 Kg/cm$^2$G by pressure controlling valve 9. The stirring condition is the same as that of the first stage stirring vessel. The oil velocity in the second heater tube was kept at 2 m/sec by circulating between the second stage stirring vessel and second heater through line i by second circulation pump 8. After an average residence time of 3 hours was maintained, the second stage treated oil continuously withdrawn from the second stage stirring vessel was charged into vacuum flash tower 10 maintained at a pressure of 60 mm Hg through line e to distill off continuously fractions having boiling points substantially lower than 400° C. and to obtain a finished product pitch. The properties are shown in Table IV.

COMPARATIVE EXAMPLE 5

In the Figure, a raw material oil was fed in the second heater through line c to increase its temperature to 410° C. and was heat treated in the second stage stirring vessel maintained at the same conditions as those in Example 3. A product pitch was obtained by operating in the same manner as in Example 3. The properties are also shown in Table IV.

Unburned refractories were obtained from the pitch thus obtained by operating in the same way as in Example 1 except that a magnesia clinker having a particle size of 0.7–5.0 mm as a coarse-grained particle, a finely powdered magnesia as a fine particle and 8 parts by weight of fine powdered graphite were employed.

The unburned refractories obtained in this manner were lined partially in the neighborhood of slag line on the inlet side of an oxygen up-blown convertor. After 500 charge operations of said convertor, the loss in amount of the refractories was compared. The results are shown in parallel in Table IV.

As clear from Table IV, it has been proved that when the unburned refractories of this invention are employed, the loss in amount in the practical convertor operation is very small and they have quite excellent properties, as compared with the case of Comparative Example 5.

TABLE IV

| Experiment number | | Example 3 | Comparative Example 5 |
|---|---|---|---|
| Yield of pitch (%) | | 48 | 35 |
| Physical property of product pitch | Benzene-insoluble component (%) | 23 | 36 |
|  | Fixed carbon (%) | 55 | 46 |
|  | Softening point (°C.) | 84 | 90 |
| Continuous operating condition | | a small amount of carbon was deposited in second heater tube in 14 days' continuous operation | second heater tube was clogged in 13 hours after starting of operation |
| Size of original refractories (mm) | | 700 | 700 |
| Size of remainder refractories (mm) | | 250 | 190 |
| Loss in amount (mm) | | 450 | 510 |

Examples 4–5 and Comparative Examples 6–9

EXAMPLES 4–5

A heavy residual oil produced as a by-product in steam cracking of naphtha was taken. The properties are shown in Table I. The heavy residual oil as a raw material oil was first increased its temperature to a prescribed temperature by passing through a pipe still, followed by a continuous charge into the first stage stirring vessel in completely mixed state to be treated with heat. The stirring vessel was maintained at a prescribed pressure and a prescribed average residence time by controlling the level therein.

The heat-treated product continuously withdrawn from the first stage stirring vessel was increased its temperature to a prescribed temperature by passing through a pipe still in the second stage stirring vessel and then was introduced into the second stage stirring vessel to be subjected to heat treatment at a prescribed pressure and average residence time while controlling the level. Then the heat-treated product after completion of the final heat treatment was continuously withdrawn from the second stage stirring vessel and was introduced into a flash distillation tower operated under the conditions of 250° C. and a pressure of 120 mm Hg. After a lighter oil having a boiling point of 400° C. or less was distilled off from the flash distillation tower, a product pitch was taken out at the bottom. The treating conditions in the first and second stages, experimental results of physical properties of the product pitch are shown in Table V. The running was carried out for 150 hours after a stationary temperature was attained both in Example 4 and in Example 5. As a result, only a slight fouling was found in the pipe still and stirring vessel, however no obstale to operation was found.

COMPARATIVE EXAMPLES 6–7

A conventional one stage heat treatment reaction was performed to compare with the method according to this invention.

The same raw material oil as that used in Example 4 was fed in a pipe still to increase it temperature to a prescribed temperature and was continuously charged into a soaker. Then it was treated with heat under a prescribed pressure while controlling the level so as to be able to maintain a prescribed residence time. After that, the heat-treated oil was led to a flash distillation tower, and a product pitch was obtained in the same manner as in Example 4. The results are shown in parallel in Table V. However, in Comparative Example 6, coking occurred to result in clogging of the pipe still in 13 hours of operation after the temperature became stationary. In comparative Example 7, the operation was carried out for 80 hours after the temperature reached stationary state.

COMPARATIVE EXAMPLE 8

Pitch was obtained by operating in the same way as in Example 4 except that the temperature of the first stage reaction vessel was maintained at 240° C. The results are shown in Table V. Also in this case, there occurred a severe coking in the pipe still.

TABLE V

| Experiment number | Treating condition in first stage | | | Treating condition in second stage | | | Initial benzene-insoluble component (%) | Yield of pitch (%) |
| --- | --- | --- | --- | --- | --- | --- | --- | --- |
| | Temperature (°C.) | Pressure (Kg/cm²) | Average residence time (hr) | Temperature (°C.) | Pressure (Kg/cm²)G | Average residence time (hr) | | |
| Example 4 | 310 | 15 | 1 | 400 | 12 | 1 | 2.2 | 47 |
| Example 5 | 340 | 12 | 2 | 410 | 8 | 2 | 2.4 | 46 |
| Comparative Example 6 | — | — | — | 400 | 12 | 1 | 9 | 39 |
| Example 7 | — | — | — | 330 | 10 | 2 | 0 | 50 |
| Example 8 | 240 | 15 | 1 | 400 | 12 | 1 | 7 | 40 |

Each of pitches thus obtained was impregnated into a burned dolomite brick. The burned dolomite brick was obtained by burning a dolomite clinker employed as a main raw material and had an apparent porosity of 13%. It was treated to 200° C. and was put in an impregnating bath. After degassing, each of the pitches heated to 200° C. was impregnated and filled in refractories under pressure. The resultant properties of these refractories are shown in Table VI. As a Comparative Example, a mixture of coal tar pitch and 10% of creosote oil added as a diluent was impregnated in the same manner as in Example 4. The results are also shown in parallel in Table VI. The refractories obtained by the method of this invention have very excellent properties.

TABLE VI

| | Size of original refractories (mm) | Remainder size (mm) | Loss in amount (mm) |
| --- | --- | --- | --- |
| Example 4 | 650 | 234 | 416 |
| Example 5 | 650 | 238 | 412 |
| Comparative Example 6 | 650 | 180 | 470 |
| Comparative Example 7 | 650 | 68 | 582 |
| Comparative Example 8 | 650 | 191 | 459 |
| Comparative Example 9 | 650 | 210 | 440 |

Example 6 and Comparative Example 10

EXAMPLE 6

The same raw material oil as in Example 4 was treated with heat by using the reforming apparatus shown in the Figure. The raw material oil was increased its temperature to 355° C. by passing to first heater 2 (diameter of heating tube, 21.7 mm) through line a. Then it was continuously fed in first stage stirring vessel 3 having a capacity of 300 lit. which was agitated with a stirrer under such a condition that there was no residence zone and was treated with heat at an average residence time of 3 hours. The first stage stirring vessel was maintained at 350° C., and the pressure therein was controlled to 20 Kg/cm²G by pressure controlling valve 5. The flow velocity of the oil in the first heater tube was maintained at 2 m/sec by circulating from the first stage stirring vessel to the first heater through line h by first circulation pump 4.

The first stage treated oil continuously taken out from the first stage stirring vessel was introduced into second heater 6 through line c, and the temperature was increased to 410° C. Then it was continuously fed in second stage stirring vessel 7 having a capacity of 300 lit. The second stage stirring vessel is maintained at a temperature of 405° C., and the pressure is controlled to 15 Kg/cm²G by pressure controlling valve 9. The stirring condition is the same as that of the first stage stirring vessel. The coil velocity in the second heater tube was kept at 2 m/sec by circulating between the second stage stirring vessel and second heater through line i by second circulation pump 8. After an average residence time of 3 hours was maintained, the second stage treated oil continuously withdrawn from the second stage stirring vessel was charged into vacuum flash tower 10 maintained at a pressure of 110 mm Hg through line e to distill off continuously fractions having boiling points substantially lower than 400° C. and to obtain a finished product pitch. The properties are shown in Table VII.

COMPARATIVE EXAMPLE 10

In the Figure, a raw material oil was fed in the second heater through line c to increase its temperature to 410° C. and was heat treated in the second stage stirring vessel maintained at the same conditions as those in Example 6. A product pitch was obtained by operating in the same manner as in Example 6. The properties are also shown in Table VII.

Unburned refractories were obtained from the pitch thus obtained by operating in the same way as in Example 1 except that a magnesia clinker having a particle size of 0.7-5.0 mm as a coarse-grained particle, a finely powdered magnesia as a fine particle and 8 parts by weight of fine powdered graphite were employed. Impregnation and filling in the open porous portions of burned magnesia brick were carried out with use of pitches obtained in the above-mentioned manner. The magnesia brick was prepared by conventional methods and had an apparent porosity of 13.8%. The procedure of impregnation was carried out in the same way as in Example 4.

The pitch-impregnated refractories thus obtained were partially lined in the neighborhood of slag line on the input side of an oxygen up-blown convertor having a capacity of 180 t. The loss in amount of the impregnated refractories after 600 charge operations of said convertor was compared. The results are shown in parallel in Table VII.

As clear from Table VII, it has been proved that when the unburned refractories of this invention are employed, the loss in amount in the practical convertor operation is very small and they have quite excellent properties, as compared with the case of comparative Example 10.

TABLE VII

| Experiment number | Example 6 | Comparative Example 10 |
|---|---|---|
| Yield of pitch (%) | 50 | 39 |
| Initial benzene-insoluble component (%) | 2.1 | 8 |
| Continuous operating condition | a small amount of carbon was deposited in second heater tube in 14 days' continuous operation | second heater tube was clogged in 15 hours after starting of operation |
| Size of original refractories (mm) | 650 | 650 |
| Size of remainder refractories (mm) | 250 | 188 |
| Loss in amount (mm) | 400 | 462 |

What is claimed is:

1. A method for producing unburned refractories which comprises the steps; continuously feeding a heavy oil having a boiling point more than 150° C. obtained by thermal cracking or steam cracking of petroleum hydrocarbons as a raw material oil in a first stage stirring vessel maintained at a pressure of more than 2 Kg/cm²G and at a temperature in the range of from 300° to 360° C.; maintaining the average residence time of said raw material oil at a time of more than 15 minutes; continuously withdrawing a first stage treated oil from said first stage stirring vessel; supplying said first stage treated oil in a second stage stirring vessel maintained at a temperature from 370° C. to 450° C.; continuously withdrawing a second stage treated oil from said second stage stirring vessel while maintaining the average residence time of said oil therein at a time of from 30 minutes to 10 hours; continuously obtaining a pitch by eliminating lighter components from said second stage treated oil; and producing unburned refractories by mixing said pitch with basic refractory materials.

2. A method for producing refractories which comprises the steps; continuously feeding a heavy oil having a boiling point more than 150° C. obtained by thermal cracking or steam cracking of petroleum hydrocarbons as a raw material oil in a first stage stirring vessel maintained at a pressure of more than 2 Kg/cm²G and at a temperature in the range of from 300° to 360° C.; maintaining the average residence time of said raw material oil at a time of more than 15 minutes; continuously withdrawing a first stage treated oil from said first stage stirring vessel; supplying said first stage treated oil in a second stage stirring vessel maintained at a temperature from 370° to 450° C.; continuously withdrawing a second stage treated oil from said second stage stirring vessel while maintaining the average residence time of said oil therein at a time of from 30 minutes to 10 hours; continuously obtaining a pitch by eliminating lighter components from said second stage treated oil; and producing refractories by impregnating and filling said pitch in the porous portions of burned refractories.

3. A method according to claim 1 or 2, wherein the pitch comprises substantially a heavy oil having a boiling point higher than 400° C.

4. A method according to claim 1, wherein the basic refractory material is at least one member selected from the group consisting of dolomite-containing refractory materials and magnesia-containing refractory materials.

5. A method according to claim 2, wherein the burned refractories are selected from the group consisting of burned dolomite-containing brick, burned magnesia-dolomite-containing brick, burned alumina-containing brick and burned magnesia-spinel-containing brick.

6. A method according to claims 1 or 2 wherein said first stage stirring vessel is maintained at a pressure of 2-30 Kg/cm²G and a temperature of 330°-350° C., the average residence time of said raw material oil in said first stage stirring vessel is 1-5 hours, said second stage stirring vessel is maintained at a temperature of 390°-430° C. and a pressure of 2-20 Kg/cm²G and said oil is maintained in said second stage stirring vessel for an average residence time of 1-5 hours.

7. A method as claimed in claim 6 wherein the pressure in said first stage stirring vessel is 5-20 Kg/cm²G and the pressure in said second stirring vessel is 5-15 Kg/cm²G.

8. A method according to claim 3 wherein said pitch has a softening point of less than 100° C. and a fixed carbon content of at least 45%.

* * * * *